(12) United States Patent
Zakhia (10) Patent No.: US 12,338,041 B2
(45) Date of Patent: Jun. 24, 2025

(54) STABLE LACTASE PRODUCT (71) Applicant: Pharmunion, LLC, Wilmington, DE (US)

(72) Inventor: Richard Zakhia, Pacifica, CA (US)

( * ) Notice: Subject to any disclaimer, the term of this patent is extended or adjusted under 35 U.S.C. 154(b) by 467 days.

(21) Appl. No.: 17/785,090

(22) PCT Filed: Dec. 24, 2020

(86) PCT No.: PCT/US2020/066995
§ 371 (c)(1),
(2) Date: Jun. 14, 2022

(87) PCT Pub. No.: WO2021/134002
PCT Pub. Date: Jul. 1, 2021

(65) Prior Publication Data
US 2023/0073935 A1  Mar. 9, 2023

Related U.S. Application Data (60) Provisional application No. 62/953,736, filed on Dec. 26, 2019.

(51) Int. Cl.
*B65D 51/28* (2006.01)
*A23L 33/00* (2016.01)
(Continued)

(52) U.S. Cl.
CPC ........ *B65D 51/2814* (2013.01); *A23L 33/115* (2016.08); *A23L 33/15* (2016.08);
(Continued)

(58) Field of Classification Search
CPC ........ B65D 1/02; B65D 1/0207; B65D 1/023; B65D 1/0238; B65D 1/0246;
(Continued)

(56) References Cited

U.S. PATENT DOCUMENTS 2,877,810 A * 3/1959 Zackheim ............. B01L 3/0282
422/934
4,464,469 A 8/1984 Parr et al.
(Continued)

FOREIGN PATENT DOCUMENTS

CN  101816330 A * 9/2010
CN  101816330 B * 4/2012
(Continued)

OTHER PUBLICATIONS

Anonymous, Lattasi O Beta-Galattosidasi (FCC 100000 ALU/G), Technical Data Sheet, May 11, 2021, Nutraceutica s.r.l., Monterenzio, Italy.
(Continued)

*Primary Examiner* — Anthony D Stashick
*Assistant Examiner* — Marcos Javier Rodriguez Molina (57) ABSTRACT

A method for the storage and delivery of a stable form of lactase to an infant as a dietary supplement. The lactase is stored first as a dry powder contained in a push cap. The push cap is then fixed to a bottle containing a plurality of anhydrous neutral oils. Once the push cap is fixed on the bottle, the push cap is pressed, releasing the lactase powder into the neutral oil. The bottle is then agitated to produce a mixture of lactase in the neutral oils. Finally, a dropper is used to deliver the stable lactase-oil mixture to the infant in need thereof.

10 Claims, 6 Drawing Sheets

US 12,338,041 B2

Page 2

(51) Int. Cl.
*A23L 33/115* (2016.01)
*A23L 33/15* (2016.01)
B65D 43/02 (2006.01)
B65D 47/18 (2006.01)
*B65D 51/32* (2006.01)
*B65D 81/32* (2006.01)

(52) U.S. Cl.
CPC .......... *A23L 33/40* (2016.08); B65D 43/0231 (2013.01); B65D 47/18 (2013.01)

(58) Field of Classification Search
CPC .......... B65D 1/0253; B65D 1/04; B65D 1/06; B65D 1/09; B65D 1/095; B65D 1/16; B65D 1/165; B65D 1/22; B65D 1/30; B65D 1/40; B65D 11/04; B65D 21/0204; B65D 21/0209; B65D 21/022; B65D 21/0222; B65D 2203/00; B65D 2203/02; B65D 2203/04; B65D 2203/06; B65D 2203/10; B65D 2203/12; B65D 2205/00; B65D 2215/02; B65D 2215/04; B65D 2217/00; B65D 2217/04; B65D 2251/0015; B65D 2251/0018; B65D 2251/0025; B65D 2251/0028; B65D 2251/0056; B65D 2251/0075; B65D 2251/009; B65D 2251/0093; B65D 2251/0096; B65D 2251/1075; B65D 23/00; B65D 23/02; B65D 23/0878; B65D 23/10; B65D 23/102; B65D 23/14; B65D 2303/00; B65D 2313/04; B65D 25/02; B65D 25/04; B65D 25/08; B65D 25/085; B65D 25/087; B65D 25/14; B65D 25/20; B65D 25/28; B65D 25/54; B65D 25/56; B65D 2517/0056; B65D 2543/00046; B65D 2543/00083; B65D 2543/00092; B65D 2543/00296; B65D 2543/00527; B65D 2543/00537; B65D 2543/00648; B65D 2543/00685; B65D 2543/0074; B65D 2543/00796; B65D 2543/00842; B65D 2571/00141; B65D 2571/0032; B65D 2571/00475; B65D 2571/0066; B65D 2571/00722; B65D 2571/0082; B65D 2571/00845; B65D 2575/3227; B65D 2575/3236; B65D 2575/3245; B65D 2575/3263; B65D 2575/3272; B65D 2575/3281; B65D 2575/367; B65D 2577/043; B65D 2581/3409; B65D 2583/0409; B65D 2583/0413; B65D 2583/0418; B65D 2585/56; B65D 31/00; B65D 33/002; B65D 33/2508; B65D 33/2541; B65D 35/10; B65D 41/02; B65D 41/04; B65D 41/0407; B65D 41/0428; B65D 41/045; B65D 41/0471; B65D 41/18; B65D 41/26; B65D 41/3409; B65D 41/3428; B65D 41/3447; B65D 41/485; B65D 43/02; B65D 43/0212; B65D 43/0231; B65D 43/16; B65D 43/162; B65D 43/169; B65D 43/22; B65D 43/26; B65D 47/00; B65D 47/06; B65D 47/063; B65D 47/065; B65D 47/08; B65D 47/0857; B65D 47/18; B65D 47/20; B65D 47/243; B65D 47/247; B65D 47/26; B65D 47/263; B65D 47/265; B65D 47/283; B65D 47/286; B65D 47/32; B65D 47/36; B65D 47/38; B65D 47/42; B65D 5/4204; B65D 5/4208; B65D 5/44; B65D 5/48; B65D 5/5088; B65D 50/00; B65D 50/04; B65D 50/046; B65D 51/002; B65D 51/18; B65D 51/20; B65D 51/222; B65D 51/227; B65D 51/24; B65D 51/241; B65D 51/242; B65D 51/246; B65D 51/247; B65D 51/249; B65D 51/28; B65D 51/2807; B65D 51/2814; B65D 51/2821; B65D 51/2828; B65D 51/2835; B65D 51/285; B65D 51/2857; B65D 51/2864; B65D 51/2871; B65D 51/2878; B65D 51/2892; B65D 51/30; B65D 51/32; B65D 53/04; B65D 53/06; B65D 55/02; B65D 65/14; B65D 65/38; B65D 65/406; B65D 65/42; B65D 65/46; B65D 65/463; B65D 71/22; B65D 71/36; B65D 73/0014; B65D 73/0028; B65D 75/002; B65D 75/008; B65D 75/20; B65D 75/24; B65D 75/30; B65D 75/326; B65D 75/327; B65D 75/36; B65D 75/367; B65D 75/38; B65D 75/58; B65D 75/5805; B65D 75/5855; B65D 75/5866; B65D 75/5883; B65D 77/04; B65D 77/0413; B65D 77/0426; B65D 77/0486; B65D 77/20; B65D 77/2024; B65D 77/22; B65D 77/24; B65D 77/245; B65D 79/02; B65D 81/18; B65D 81/2076; B65D 81/24; B65D 81/26; B65D 81/264; B65D 81/266; B65D 81/28; B65D 81/32; B65D 81/3205; B65D 81/3211; B65D 81/3216; B65D 81/3222; B65D 81/3227; B65D 81/3233; B65D 81/3238; B65D 81/3255; B65D 81/3261; B65D 81/3266; B65D 81/3272; B65D 81/3283; B65D 81/3294; B65D 81/3407; B65D 81/365; B65D 83/00; B65D 83/04; B65D 83/0409; B65D 83/0463; B65D 83/0472; B65D 83/06; B65D 83/20; B65D 83/36; B65D 83/42; B65D 83/62; B65D 83/68; B65D 83/682; B65D 83/685; B65D 83/75; B65D 83/752; B65D 85/00; B65D 85/34; B65D 85/54; B65D 85/60; B65D 85/70; B65D 85/72; B65D 85/78; B65D 85/804; B65D 85/8043; B65D 85/8049; B65D 85/8052; B65D 85/8055; B65D 85/8061; B65D 85/8067; B65D 85/808; B65D 85/812; B65D 85/816; B65D 88/26; B65D 88/54; B65D 43/0227; B01L 3/00; B01L 3/0282; A23L 11/05; A23L 11/07; A23L 11/33; A23L 11/40; A23L 11/45; A23L 11/65; A23L 13/428; A23L 15/00; A23L 15/20; A23L 15/30; A23L 19/01; A23L 19/03; A23L 19/105; A23L 19/14; A23L 2/382; A23L 2/385; A23L 2/39; A23L 2/52; A23L 2/56; A23L 2/60; A23L 21/00; A23L 21/12; A23L 23/00; A23L 25/00; A23L 25/25; A23L 25/40; A23L 27/00; A23L 27/16; A23L 27/20; A23L 27/204; A23L 27/2052; A23L 27/2054; A23L 27/2056; A23L 27/30; A23L 27/32; A23L 27/33; A23L 27/34; A23L 27/36; A23L 27/50; A23L 27/60; A23L 27/70; A23L 27/77; A23L 27/80; A23L 27/86; A23L 27/88; A23L 29/00; A23L 29/015; A23L 29/035; A23L 29/04; A23L 29/06; A23L 29/10; A23L 29/20; A23L 29/206; A23L 29/238; A23L 29/262; A23L 29/273; A23L 29/274; A23L 29/294; A23L 29/30; A23L 29/35; A23L 31/00; A23L 31/10; A23L 33/10; A23L 33/105; A23L 33/115; A23L 33/12; A23L 33/125; A23L 33/135; A23L 33/14; A23L 33/15; A23L 33/16; A23L 33/17; A23L 33/175; A23L 33/18; A23L 33/185; A23L 33/19; A23L 33/21; A23L 33/24; A23L 33/40; A23L 5/00; A23L 5/25; A23L 7/00; A23L 7/101; A23L 7/111; A23L 7/115; A23L 7/122; A23L 7/13; A23L 7/165; A23L 7/183; A23L 7/191; A23L 7/196; A23L 7/1965; A23L 9/00; A23L 9/12; A23L 9/22

USPC ...... 206/0.5, 1.5, 204, 213.1, 216, 217, 219, 206/220, 221, 222, 223, 229, 231, 232, 206/308.1, 312, 363, 365, 438, 439, 206/45.29, 457, 459.1, 459.5, 461, 469, 206/470, 484, 484.2, 499, 5, 503, 508, 206/509, 524.1, 524.2, 524.3, 524.6, 206/524.7, 526, 528, 529, 530, 531, 532, 206/533, 534, 534.1, 535, 536, 538, 539, 206/540, 553, 555, 557, 568, 569, 570, 206/571, 572, 581, 595, 597, 6.1, 736, 206/745, 756, 769, 807, 818, 828

See application file for complete search history.

(56) References Cited

U.S. PATENT DOCUMENTS

| | | | |
|---|---|---|---|
| 4,982,875 A * | 1/1991 | Pozzi | B65D 51/285 604/416 |
| 6,008,027 A | 12/1999 | Langner | |
| 6,365,208 B1 | 4/2002 | Kulkarni et al. | |
| 6,562,338 B2 | 5/2003 | Eisenhardt et al. | |
| 6,926,138 B1 * | 8/2005 | Basham | B65D 51/2828 215/DIG. 8 |
| 7,955,831 B2 | 6/2011 | Beckhoven et al. | |
| 8,387,786 B2 * | 3/2013 | Fontana | B65D 51/2892 215/DIG. 8 |
| 9,016,470 B2 | 4/2015 | Scarpa et al. | |
| 2004/0020797 A1* | 2/2004 | Fontana | A61J 1/2093 206/219 |
| 2005/0161348 A1* | 7/2005 | Morini | B65D 51/285 206/219 |
| 2009/0065379 A1* | 3/2009 | Casey | B65B 29/10 206/221 |
| 2011/0290678 A1 | 12/2011 | Simonian et al. | |
| 2013/0058913 A1 | 3/2013 | Solomon | |
| 2015/0305394 A1 | 10/2015 | Mazer et al. | |
| 2016/0199801 A1* | 7/2016 | Casey | B01F 33/50111 366/130 |
| 2018/0186528 A1* | 7/2018 | Tonn | G01F 11/16 |

FOREIGN PATENT DOCUMENTS

| | | | | |
|---|---|---|---|---|
| CN | 206125812 U | * | 4/2017 | |
| CN | 108910229 A | * | 11/2018 | |
| CN | 209410739 U | * | 9/2019 | |
| CN | 107858342 B | | 9/2020 | |
| EP | 1208848 A1 | | 5/2002 | |
| FR | 3077273 A1 | * | 8/2019 | ......... B65D 81/3205 |
| JP | 2013542134 A | | 11/2013 | |
| JP | 2017529291 A | | 10/2017 | |
| JP | 3223051 U | | 9/2019 | |
| WO | 2013084244 A1 | | 6/2013 | |
| WO | 2015132349 A1 | | 9/2015 | |
| WO | WO-2016038357 A1 | * | 3/2016 | ................ A61J 1/14 |
| WO | 2018130654 A1 | | 7/2018 | |
| WO | WO-2019113276 A1 | * | 6/2019 | ................ B01F 1/00 |

OTHER PUBLICATIONS

Bosso, Alexandra et al., "Lactose hydrolysis potential and thermal stability of commercial beta-galactosidase in UHT and skimmed milk" Food Science Technology, Campinas, 36(1): 159-165, Jan.-Mar. 2016, Brazil.

Zhang et al. "Solid-in-Oil-in-Water Emulsions for Delivery of Lactase To Control in Vitro Hydrolysis of Lactose in Milk." Journal of Agricultural and Food Chemistry [online], Oct. 5, 2017, vol. 65, Issues 43, pp. 9522-9528, Retrieved from the Internet: , Abstract only.

* cited by examiner

STABLE LACTASE PRODUCT

CROSS-REFERENCE TO RELATED APPLICATIONS

This application is an international patent application to be processed according to the Patent Cooperation Treaty and is a continuation of the provisional patent application, Ser. No. 62/953,736, filed in the United States Patent Office on 26 Dec. 2019, and claims the priority thereof and is expressly incorporated herein by reference in its entirety.

TECHNICAL FIELD

The present disclosure relates generally to a digestive aid. More particularly, the present disclosure relates to a stable form of a digestive aid for infants.

BACKGROUND

A colicky baby is a very stressful situation for new parents. Colic generally occurs when the baby is very young, before solid food is introduced. Parents try to eliminate the source of the discomfort. If the baby is on formula, parents try different formulas including those that do not have cow's milk as a basis. Breastfeeding moms begin elimination diets, abstaining from foods known to produce gas in adults.

A growing amount of evidence suggests that infants may have problems digesting lactose, a sugar found both in cow's milk and breast milk. To digest lactose, the stomach must have an enzyme called lactase.

It is rare that infants are born without the ability to produce lactase, whereas colic is not uncommon. It is suspected that the gassiness may be caused by the naturally occurring lactase being overwhelmed by an excess of lactose or that lactase production is insufficient.

Unfortunately, most lactase products on the market are not suitable for infants because of the liquids that it is dissolved in. Lactase is not stable in most liquids that are suitable for infants, such as water. Powders mixed with food are not suitable for infants who have not started eating solid foods. Infants and young children cannot be dosed with tablets or capsules because of choking hazards.

Additionally, while lactase may be stable in glycerol, glycerol is known to have laxative properties. As an osmotic laxative, glycerol promotes the retention of fluid in the bowel by increasing osmotic pressure in the intestine. Alternatively, glycerol may also, acting through its local irritant effects, have a lubricating and softening effect.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a method for storage and delivery of shelf-stable lactase in neutral oil to infants as a dietary aid. Accordingly, an aspect of an example embodiment in the present disclosure provides a shelf-stable dispersion of lactase powder and a neutral oil.

Another aspect of an example embodiment in the present disclosure is to provide a shelf-stable form of lactase. Accordingly, the present disclosure provides a pre-measured dosage of lactase powder in a push cap that dispels the powder into a bottle containing a neutral oil.

A further aspect of an example embodiment in the present disclosure is to provide delivery of the shelf-stable lactase mixture to an infant. Accordingly, the present disclosure provides a dropper that is loaded with the prepared mixture of lactase powder in a neutral oil that is delivered to the infant either directly or with their breast milk or formula.

Accordingly, the present disclosure describes a method for the storage and delivery of self-stable lactase to infants as a dietary aid. A bottle of neutral oil is fixed with a cap containing pre-measured lactase powder. The plunger on the cap is pressed and the pre-measured lactase powder is deposited into the neutral oil. The container is agitated to dissolve the pre-measured lactase in the neutral oil. A dropper is used to deliver the known concentration of lactase in oil to the infant.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-6 illustrate a method of storing and then delivering a lactase dietary supplement to an infant. More specifically, the method stores and delivers a shelf-stable lactase (Beta-galactosidase) to an infant or individual in need of same. In particular, the method employs a system comprising a bottle 10 having a receptacle 18 containing a plurality of neutral oils 14, a push cap 20 holding a powder 40 in a compartment 16, the powder further comprising the shelf-stable lactase, a flow agent and a release agent, and a dropper 60.

The term "neutral oils" refers to edible oils generally recognized as safe for human consumption that have a neutral flavor. In other words, these neutral oils have little or no distinctive flavor.

Figure 1:
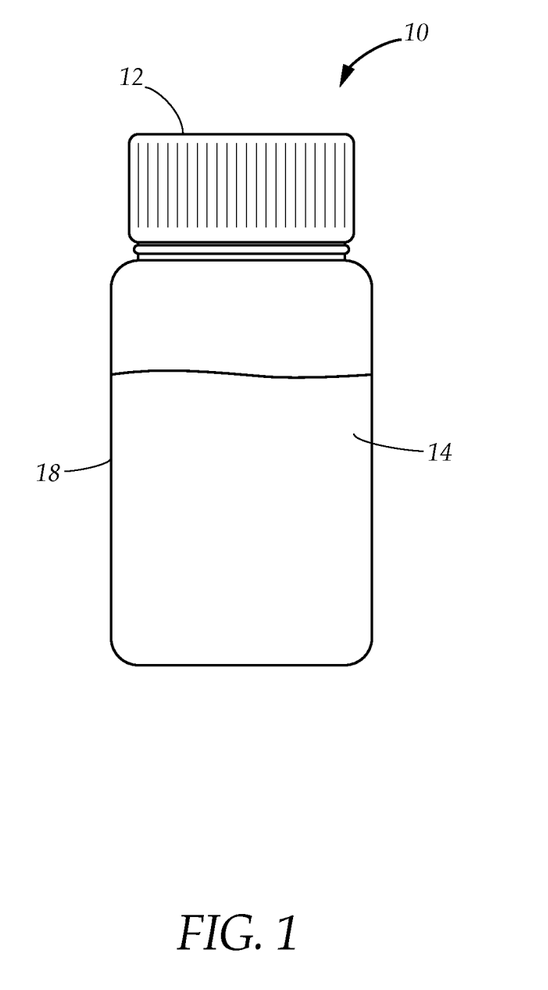
FIG. 1 is a front elevational view of an example embodiment of a 10 milliliter ("ml") bottle containing a neutral oil.

The shelf-stable lactase is provided as a system that includes at least one bottle 10 with a receptacle 18 containing an anhydrous mixture of a plurality of neutral oils 14, such as but not limited to sunflower oil and Vitamin E. The plurality of neutral oils 14 totals about 10 milliliters ("ml"). The bottle is sealed with a first cap 12, a standard fitting cap that is selectively removed when the dietary supplement is being prepared for delivery and replace after preparation for storage.

Figure 2:
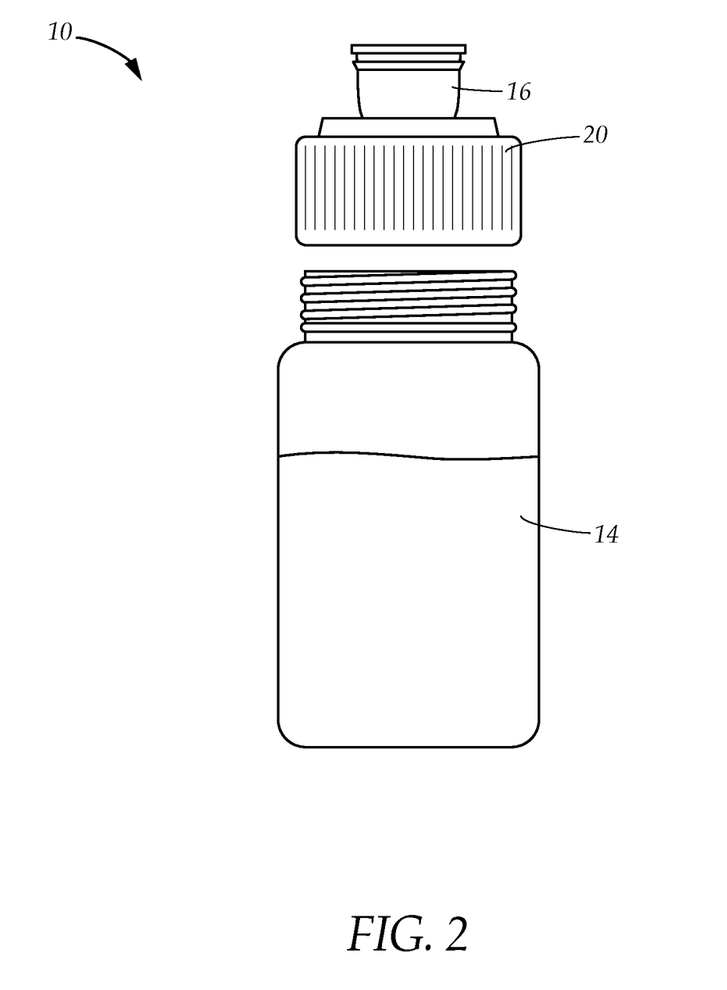
FIG. 2 is a front elevational view of an example embodiment of a push cap containing a pre-measured amount of lactase (Beta-galactosidase) affixed to the 10 ml bottle.
Figure 6:
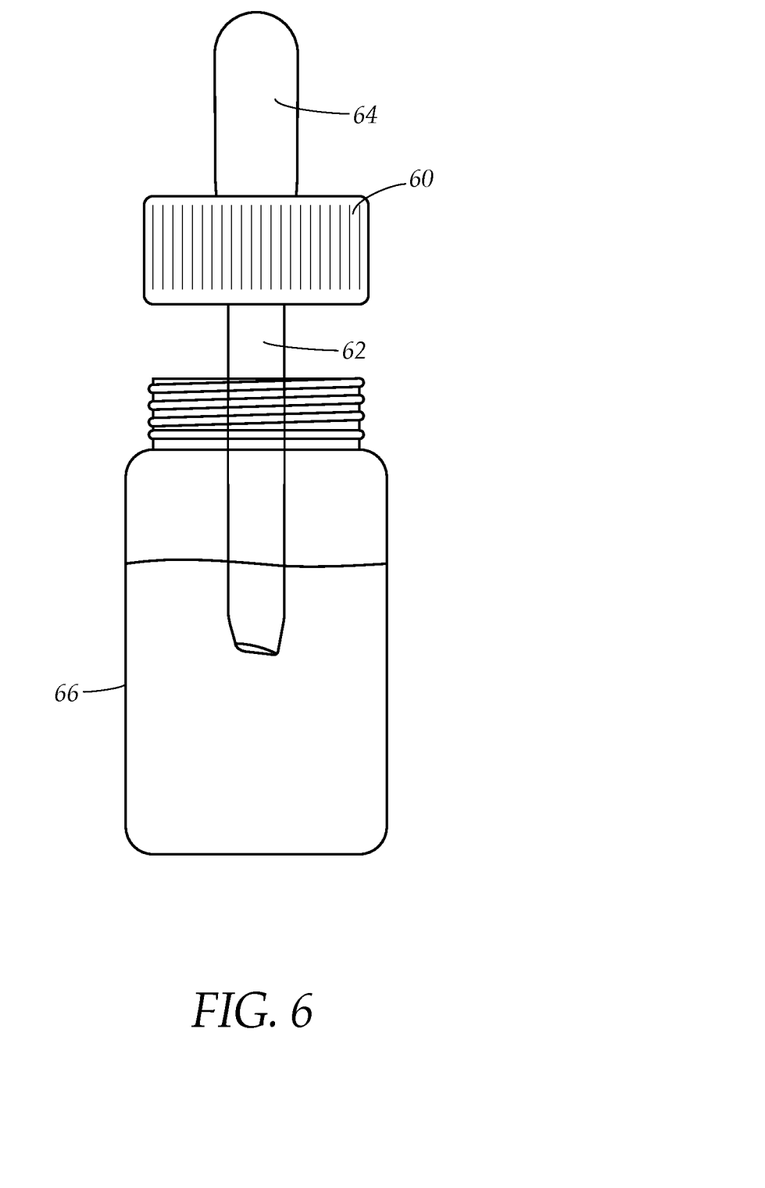
FIG. 6 is a front elevational view of a dropper withdrawing the neutral oil and lactase mixture out of the bottle.

The system also includes a push cap 20 containing a powder 40 comprising lactase, a release agent and a flow agent in a compartment 16. The powder 40 comprises at least 190 milligrams ("mg") of powder 40. The powder comprises a minimum of 158.2 mg of lactase, 4-6 mg of magnesium stearate, and 25-30 mg of bamboo fiber in a compartment 16. Preferably, the powder has 5 mg of magnesium stearate and 26.8 mg of bamboo fiber. It is understood by those of ordinary skill in the art that a range of +/−10% of the targeted preferable amounts is acceptable for a product of this type. Finally, the system has a dropper 60 configured to deliver the finished lactase product 66 containing the lactase powder 40 in the neutral oil 14 to the infant.

It is further understood that magnesium stearate is an anti-adherent or release agent that aids in the dispersal of the powder into the oil. Other similar salts of fatty acids that are release agents that are generally recognized as safe are acceptable in this product.

Further, bamboo fiber aids in the flow of the powder but other cellulosic powders that are generally recognized as safe and aids the flow of powders are acceptable in this product.

Figure 3:
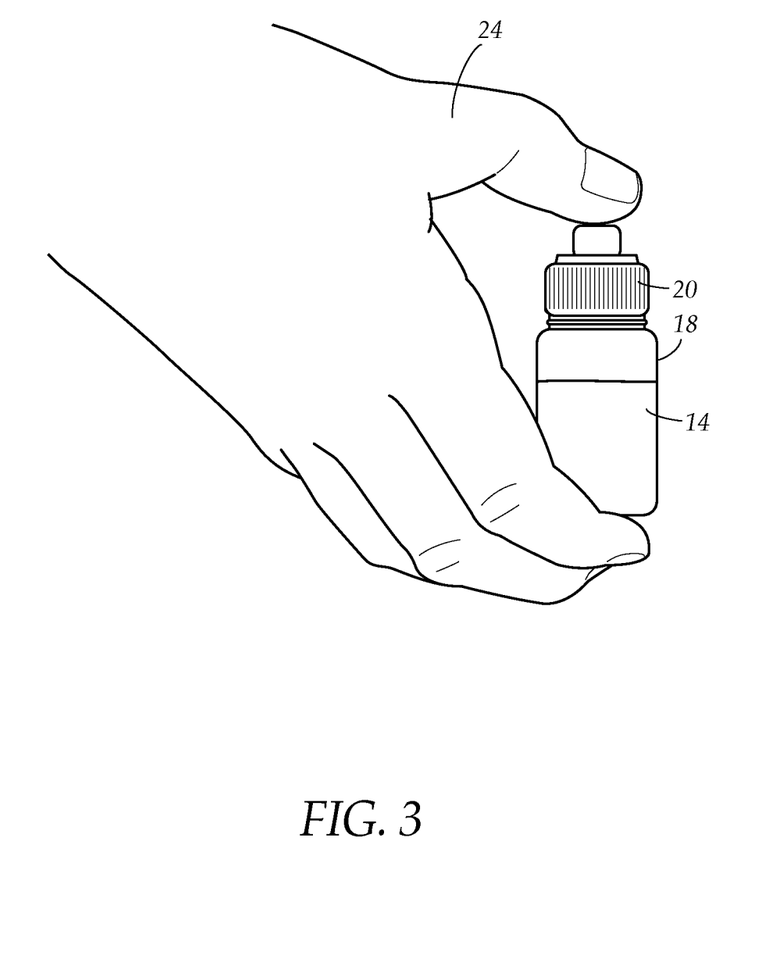
FIG. 3 is a front elevational view of a user squeezing a plunger on the push cap containing a pre-measured amount of lactase.
Figure 4:
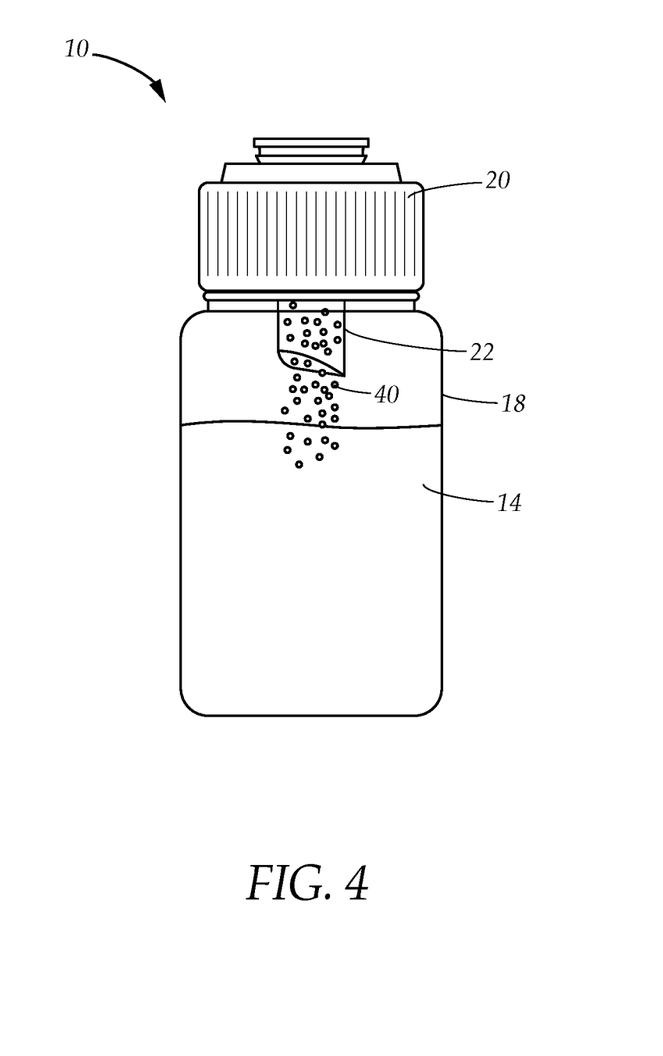
FIG. 4 is a front elevational view of the lactase powder dispensing into the neutral oil.
Figure 5:
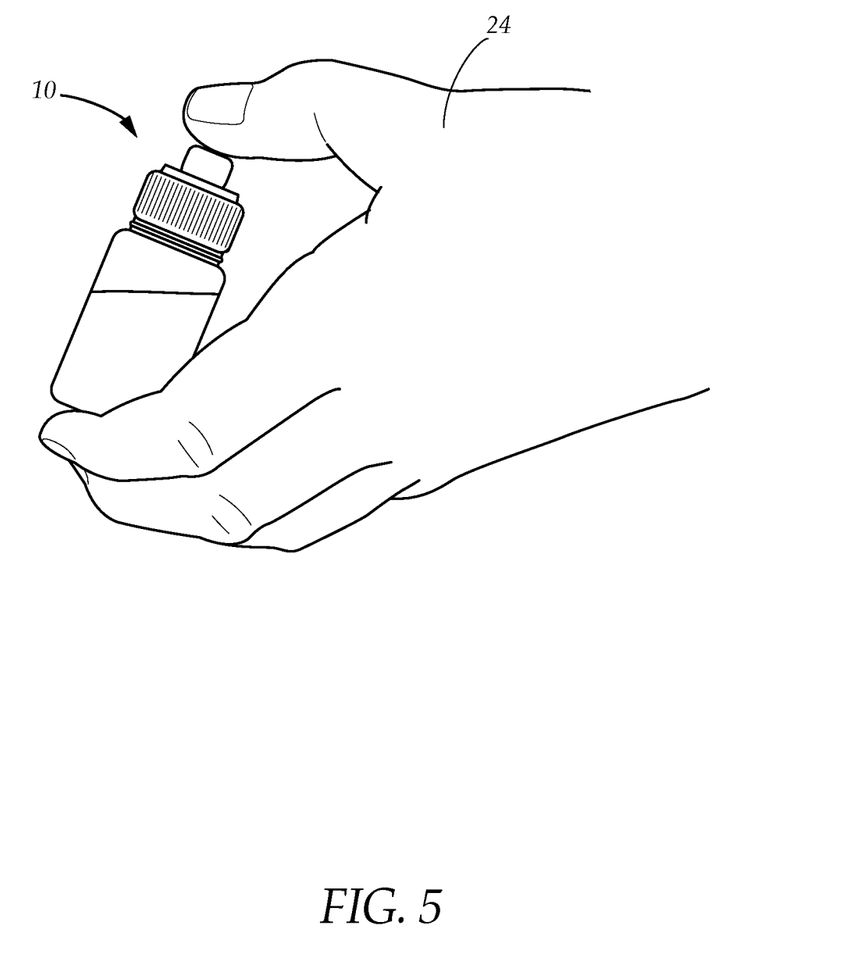
FIG. 5 is a front elevational view of the user agitating the bottle containing the neutral oil and the lactase powder.

The push cap has a plunger 22 that pushes through the compartment containing the powder creating a channel for the powder to enter the receptacle 18 holding the neutral oils 14.

The push cap 20 is selectively affixed to the bottle 10 by screwing onto the bottle, the bottle have standard screw threads.

The user first removes the first cap 12 standard from the bottle 10 containing the 10 ml of the neutral oils 14. Then the user replaces the first cap with the push cap 20 by affixing the push cap onto the bottle 10. The next step is the user 24 presses the plunger 22 of the push cap 20 to dispel the powder 40 into the oil mixture of neutral oils 14 and agitates the bottle 10, dispersing the powder 40 in the oil mixture of neutral oils 14.

The resulting finished lactase product 66 contains lactase dissolved in the neutral oil 14. The oil mixture of neutral oils 14 is necessary because lactase is not as stable in an aqueous solution. Additionally, some neutral oils such as glycerin are not used as a solvent due to its laxative properties. Finally, keeping the powder 40 removed from the oil mixture of neutral oils oil 14 further extends the stability of the lactase during storage prior to use, making the product more effective.

The finished lactase product 66 comprising the mixture of neutral oils 14 and the powder 40 containing lactase 40 may be drawn into the included dropper 60. The dropper 60 delivers the finished lactase product 66 to an infant in 0.5 ml (700 IU) doses 70. The doses 70 is delivered directly to the infant before feeding or added to breast milk or formula.

The product has a greater shelf stability as a two component system than the currently available hydrophilic mixtures.

The finished lactase product 66 has greater shelf stability in neutral oils 14 than lactase in aqueous and more hydrophilic solvent systems. The greater stability allows the user to provide at least eight doses over as long as an eight-day period whereas hydrophilic solutions of lactase are only stable for a day or two.

To use the method as described hereinabove, the user has a kit. The kit comprises the bottle 10 having the receptacle 18 containing a plurality of anhydrous neutral oils 14, the first cap 12 and the second cap 20, the second cap configured as a push cap having a compartment 16 containing the powder 40 that further comprises a lactase, a release agent and a flow aid.

The kit may be further modified with a dropper 60 having a pipet 62 and a bulb 64.

Physical stability of the lactase mixture in neutral oils as described hereinabove were performed under accelerated conditions 40° C. and 75% relative humidity for 36 weeks. Evaluations were performed and the results are presented in Table 1 and Table 2. The product maintained physical stability throughout the testing period.

TABLE 1

Product Name: LACTACOL 5 SINGLE-DOSE BOTTLES 8 ML AND DROPPER (Caps Only)
Batch No: ST419; Production date: July 2019; Expiry date: July 2021
Accelerated Stability Storage Conditions: 40° C. ± 2° C./75% RH ± 5% HR

| Time Point | | t0 | t4w | t8W | t15W | t18W | t36W |
|---|---|---|---|---|---|---|---|
| SCHEDULED DATE OF TESTING: | | Jul. 15, 2019 | Aug. 12, 2019 | Sep. 9, 2019 | Oct. 28, 2019 | Nov. 18, 2019 | Mar. 23, 2020 |
| ACTUAL DATE OF TESTING: | | Jul. 25, 2019 | Aug. 28, 2019 | Sep. 20, 2019 | Oct. 28, 2019 | Nov. 15, 2019 | Mar. 23, 2020 |
| PHYSICO-CHEMICAL ANALYSIS | SPECIFICATIONS | RESULTS | RESULTS | RESULTS | RESULTS | RESULTS | RESULTS |

TABLE 1-continued

Product Name: LACTACOL 5 SINGLE-DOSE BOTTLES 8 ML AND DROPPER (Caps Only)
Batch No: ST419; Production date: July 2019; Expiry date: July 2021
Accelerated Stability Storage Conditions: 40° C. ± 2° C./75% RH ± 5% HR

| Time Point | | t0 | t4w | t8W | t15W | t18W | t36W |
|---|---|---|---|---|---|---|---|
| ASPECT | Light beige fine powder | OK | OK | OK | OK | OK | OK |
| PACKING | Not thickened | OK | OK | OK | OK | OK | OK |

TABLE 2

Product Name: LACTACOL 5 SINGLE-DOSE BOTTLES 8 ML AND DROPPER (Bottle Only)
Batch No: ST419; Production date: July 2019; Expiry date: July 2021
Accelerated Stability Storage Conditions: 40° C. ± 2° C./75% RH ± 5% HR

| Time Point | | t0 | t4w | t8W | t15W | t18W | t36W |
|---|---|---|---|---|---|---|---|
| SCHEDULED DATE OF TESTING: | | Jul. 15, 2019 | Aug. 12, 2019 | Sep. 9, 2019 | Oct. 28, 2019 | Nov. 18, 2019 | Mar. 23, 2020 |
| ACTUAL DATE OF TESTING: | | Jul. 25, 2019 | Aug. 28, 2019 | Sep. 20, 2019 | Oct. 28, 2019 | Nov. 15, 2019 | Mar. 23, 2020 |
| PHYSICO-CHEMICAL ANALYSIS | SPECIFICATIONS | RESULTS | RESULTS | RESULTS | RESULTS | RESULTS | RESULTS |
| ASPECT | clear, straw-yellow color | OK | OK | OK | OK | OK | OK |
| FLAVOUR | oil with a characteristic taste | OK | OK | OK | OK | OK | OK |
| VISCOSITY | low viscosity-fluid | OK | OK | OK | OK | OK | OK |
| BOTTLE ANALYSIS | | | | | | | |
| SCREWING | the screwed cap holds from 15° C. to 20° C. | OK | OK | OK | OK | OK | OK |
| LEACHING | the external sides of the bottle not wet with oil | OK | OK | OK | OK | OK | OK |
| BOTTLE DEFORMATION | the plastic material of the bottle withstands contact with the contents | OK | OK | OK | OK | OK | OK |
| CAP DEFORMATION | the plastic material of the cap withstands the contact with the content, without splitting or cracking | OK | OK | OK | OK | OK | OK |
| BOTTLE HERMETIC SEAL | holding test in the vacuum chamber (−0.7 bar per 15 seconds) | OK | OK | OK | OK | OK | OK |

After 8 months all caps have straight profile again, without any deformation near its top edge. Test ended successfully.

Further shelf life studies were conducted at controlled room temperature (Temperature: 25±2° C.; RH 60%±5% RH).

TABLE 3

Product Name: LACTACOL 5 SINGLE-
DOSE BOTTLES 8 ML AND DROPPER
Batch No: ST419; Production date: July 2019; Expiry date: July 2021
Long Term Stability: T17 months
(Temperature: 25 ± 2° C. - RH 60 ± 5%)

| TESTS: Microbiological quality (solid and liquid phase) | Specification | Results | U.M. |
|---|---|---|---|
| Aerobic mesophilic bacterial count (PH EURO) | $\geq 2*10^4$ | <10 | CFU/g |
| *Escherichia coli* (PH EURO) | Absent | Absent | /g |
| Bile-Tolerant Gram-Negative Bacteria (PH EURO) | $\geq 2*10^2$ | <10 | CFU/g |
| *Staphylococcus aureus* (PH EURO) | Absent | Absent | /g |
| *Salmonella* spp. (PH EURO) | Absent | Absent | /g |
| Molds (PH EURO) | $\geq 2*10^2$ | <10 | CFU/g |
| Yeasts (PH EURO) | $\geq 2*10^2$ | <10 | CFU/g |

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a method for storage and delivery of shelf-stable lactase to an infant. The disclosure is illustrated by example in the drawing figures, and throughout the written description. It should be understood that numerous variations are possible, while adhering to the inventive concept. Such variations are contemplated as being a part of the present disclosure.

What is claimed is:

1. A system for storing and delivering a lactase dietary supplement, comprising:
    a bottle having a first cap and a receptacle, the receptacle containing a plurality of anhydrous neutral oils;
    a second cap, said second cap further comprising a push cap having a plunger and a compartment containing a powder further comprising lactase, a release agent and a flow aid; and
    a dropper configured for delivery of the powder dispersed in the anhydrous neutral oils.

2. The system as described in claim 1, wherein the second cap is selectively screwed onto the bottle.

3. The system as described in claim 1, wherein the plunger of the push cap of the second cap is pushed into the receptacle and delivers the powder into the plurality of anhydrous neutral oils when the second cap is selectively affixed onto the bottle.

4. The system as described in claim 3, wherein the first cap is selectively replaced on the bottle during storage after the powder is dispersed into the plurality of neutral oils.

5. The system as described in claim 4, wherein the dropper is configured for measuring a suitable amount of the powder mixture dispersed into the plurality of anhydrous neutral oils for an infant in need thereof.

6. The system as described in claim 1, wherein the plurality of anhydrous neutral oils further comprises vitamin E.

7. A method for preparing a suitable dose of lactase for an infant, comprising:
    providing a bottle with a receptacle, a first cap configured for storage and a second cap, the second cap comprising a push cap, the receptacle containing anhydrous neutral oils, the push cap having a plunger and a compartment containing a powder mixture of lactase, a release agent and a flow agent;
    removing the first cap from the bottle and replacing the first cap with the second cap;
    dispensing the powder mixture into the anhydrous neutral oils by pushing the plunger on the second cap into the receptacle of the bottle;
    agitating the powder and anhydrous neutral oils until the powder is fully dispersed in the anhydrous neutral oils forming a lactase dispersion.

8. The method as described in claim 7, whereas the step of agitating the mixture is followed by measuring a suitable amount of the lactase dispersion with a dropper for providing a dose to an infant in need thereof.

9. The method as described in claim 8, whereas the step of measuring the suitable amount is followed by replacing the first cap on the bottle for storage.

10. A kit for storing and delivering a lactase dietary supplement for use with infants, comprising:

a bottle having a receptacle containing a plurality of anhydrous neutral oils;
a first cap configured for sealing the bottle for storage; and
a second cap, the second cap configured as a push cap having a compartment containing a powder further comprising a lactase, a release agent and a flow aid.

* * * * *